United States Patent
Chae et al.

(10) Patent No.: US 9,527,523 B2
(45) Date of Patent: Dec. 27, 2016

(54) POWER TRANSMISSION DEVICE OF ELECTRIC POWER STEERING APPARATUS

(71) Applicant: Mando Corporation, Pyeongtaek-si (KR)

(72) Inventors: Han Sang Chae, Seongnam-si (KR); Jung Sik Park, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/745,350

(22) Filed: Jun. 19, 2015

(65) Prior Publication Data

US 2015/0367880 A1 Dec. 24, 2015

(30) Foreign Application Priority Data

Jun. 23, 2014 (KR) .................. 10-2014-0076332

(51) Int. Cl.
*B62D 5/04* (2006.01)
*F16D 3/76* (2006.01)
(Continued)

(52) U.S. Cl.
CPC .................. *B62D 5/04* (2013.01); *F16D 1/101* (2013.01); *F16D 3/76* (2013.01); *F16D 3/68* (2013.01); *F16D 2001/103* (2013.01)

(58) Field of Classification Search
CPC .............. B62D 5/04; F16D 1/101; F16D 3/76; F16D 3/68; F16D 2001/103
(Continued)

(56) References Cited

U.S. PATENT DOCUMENTS 6,629,578 B2 * 10/2003 Saruwatari ........... B62D 5/0421
180/444
6,637,558 B2 * 10/2003 Oliver .................... F16F 9/535
180/400
(Continued)

FOREIGN PATENT DOCUMENTS

JP 2007-161165 6/2007
KR 10-2011-0109523 A 10/2011
KR 10-1195466 B 10/2012

OTHER PUBLICATIONS

Office Action dated Mar. 18, 2016 for German Patent Application No. 10 2015 210 822.8.
(Continued)

*Primary Examiner* — Joseph Rocca
*Assistant Examiner* — Michael Stabley
(74) *Attorney, Agent, or Firm* — Ladas & Parry, LLP

(57) ABSTRACT

The present invention relates to a power transmission device of an electric power steering apparatus. The power transmission device includes: a driving shaft of a motor having an accommodation part formed at a rotation center thereof; a coupling member inserted into the accommodation part and having an axial through-hole formed therethrough; and a gear shaft including a coupling part formed on one side thereof to be coupled to the axial through-hole, and a gear part formed on the other side thereof. According to the present invention as described above, in a power transmission device of an electric power steering apparatus, it is possible to reduce rattle noise generated as backlash increases due to wearing-out of a gear or generated due to impact transmitted from a road surface through a vehicle wheel and a steering shaft while improving a driver's
(Continued)

steering feeling by reducing a locking feeling and a rotational resistance between a driving shaft of a motor and a gear shaft.

7 Claims, 8 Drawing Sheets

(51) Int. Cl.
 *F16D 1/10* (2006.01)
 *F16D 3/68* (2006.01)
(58) Field of Classification Search
 USPC .......................................................... 180/444
 See application file for complete search history.

(56) References Cited

U.S. PATENT DOCUMENTS

| | | | | |
|---|---|---|---|---|
| 6,782,771 B2* | 8/2004 | Oka | ..................... | B62D 5/0409 180/444 |
| 6,938,722 B2* | 9/2005 | Sasaki | .................. | B62D 5/0424 180/443 |
| 6,973,990 B2* | 12/2005 | Honaga | ................ | B62D 5/0421 180/444 |
| 7,278,334 B2* | 10/2007 | Saruwatari | ........... | B62D 5/0412 180/444 |
| 8,459,402 B2* | 6/2013 | Hamakita | ............ | B62D 5/0409 180/443 |
| 8,905,185 B2* | 12/2014 | Ko | ....................... | B62D 5/0409 180/444 |
| 8,924,081 B2* | 12/2014 | Sonoda | ................ | B62D 5/0406 180/432 |
| 8,936,132 B2* | 1/2015 | Arai | ..................... | F16H 19/0618 180/443 |
| 2007/0163374 A1* | 7/2007 | Yamazaki | ............. | B62D 5/0409 74/409 |
| 2011/0066332 A1* | 3/2011 | Sonoda | ................ | B62D 5/0406 701/42 |
| 2011/0147113 A1* | 6/2011 | Ko | ........................ | B62D 5/0409 180/444 |
| 2012/0322566 A1* | 12/2012 | Kim | ..................... | B62D 5/0409 464/88 |
| 2013/0075189 A1* | 3/2013 | Sekikawa | ............ | B62D 5/0409 180/444 |
| 2013/0102396 A1* | 4/2013 | Zhou | ........................ | F16D 3/68 464/73 |
| 2014/0027197 A1* | 1/2014 | Kikuchi | ............... | B62D 5/0409 180/444 |
| 2014/0151146 A1* | 6/2014 | Tanaka | ................. | B62D 5/0406 180/443 |
| 2014/0291063 A1* | 10/2014 | Kim | ........................ | F16D 3/68 180/444 |
| 2015/0217804 A1* | 8/2015 | Moriyama | ................ | F16D 3/68 180/444 |

OTHER PUBLICATIONS

Office Action issued in Korean Patent Application No. 10-2014-0076332 dated May 15, 2015.

\* cited by examiner

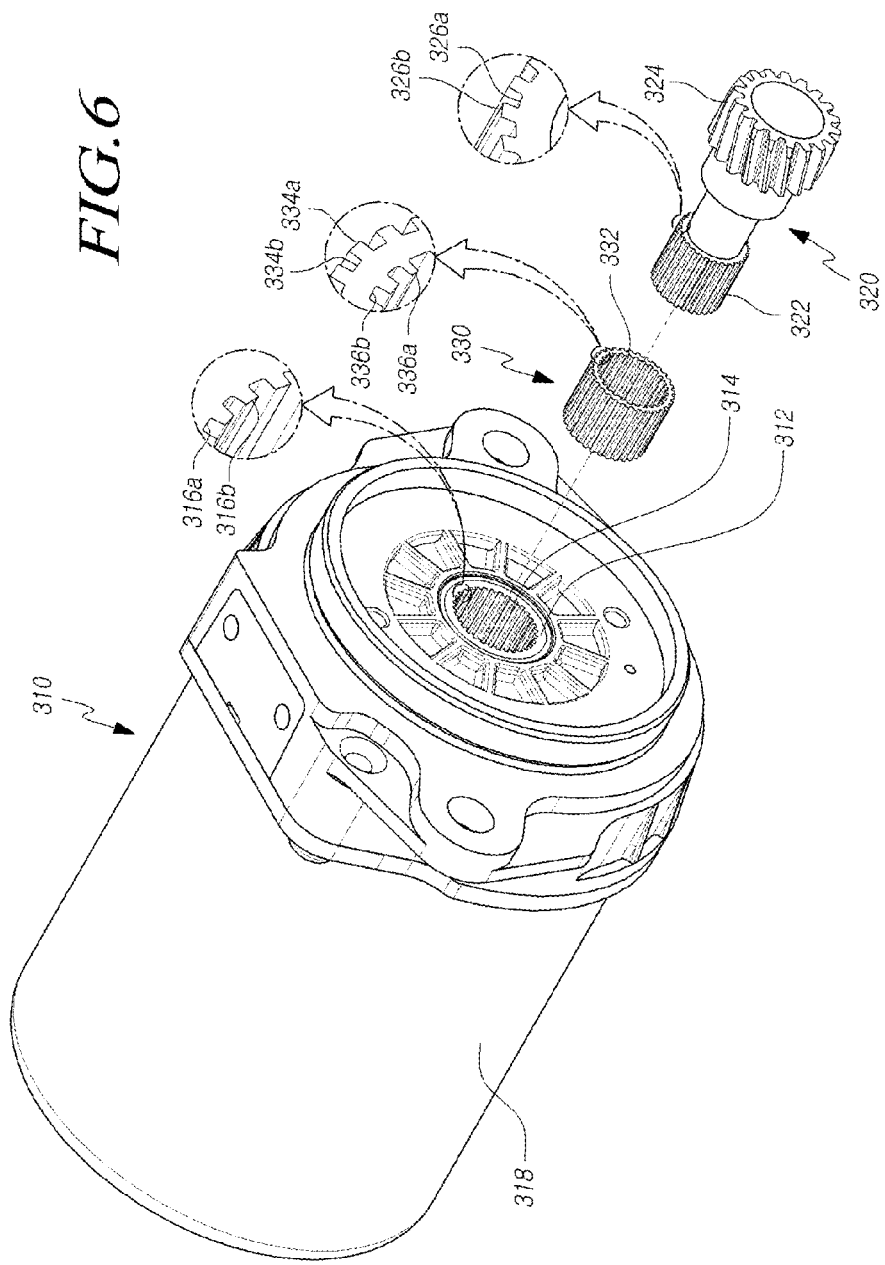

POWER TRANSMISSION DEVICE OF ELECTRIC POWER STEERING APPARATUS

CROSS-REFERENCE TO RELATED APPLICATION

This application claims priority from and the benefit under 35 U.S.C. §119(a) of Korean Patent Application No. 10-2014-0076332, filed on Jun. 23, 2014, which is hereby incorporated by reference for all purposes as if fully set forth herein.

BACKGROUND OF THE INVENTION

1. Field of the Invention

The present invention relates to a power transmission device of an electric power steering apparatus. In particular, the present invention relates to a power transmission device of an electric power steering apparatus capable of reducing rattle noise generated as backlash increases due to wearing-out of a gear or generated due to impact transmitted from a road surface through a vehicle wheel and a steering shaft while improving a driver's steering feeling by reducing a locking feeling and a rotational resistance between a driving shaft of a motor and a gear shaft.

2. Description of the Prior Art

FIG. 1 is a partial sectional view illustrating a conventional power transmission device of an electric power steering apparatus.

As illustrated in FIG. 1, the power transmission device of an electric power steering apparatus includes a motor 130, a driving shaft 205, an inner rotor 220, an outer rotor 215, an elastic body 210, a first bearing 250, a worm shaft 235, a worm gear 245, a second bearing 270, a compression screw 255, a compression spring 265, and a gear housing 260.

The motor 130 has a driving shaft 205 extending to the outside of a motor housing, and a hollow outer rotor 215 is connected with the driving shaft 205 to be interlocked with each other.

The first bearing 250 and the second bearing 270 fix the worm gear 245 to a worm wheel gear 240 installed to a steering shaft 102.

The compression spring 265 supports the second bearing 270 configured to support the worm gear 245 toward the worm wheel gear 240 by the compression screw 255 and installed to the worm gear 245.

Accordingly, when the compression screw 255 is tightened, the compression screw 255 moves to contract the compression spring 265, and consequently, the worm gear 245 can be rigidly engaged with the worm wheel gear 240 by the compression force of the compression spring 265.

An inner rotor 220 is connected to the worm shaft 235, in which the inner rotor 220 is configured to be inserted into the outer rotor 215 connected with the driving shaft 205.

The power transmission device of an electric power steering apparatus configured as described above controls the driving of a motor by an electronic control unit provided in a vehicle according to a running condition of the vehicle, and the rotating force of the worm shaft generated by the driving of the motor is imparted to the rotating force of a steering wheel manipulated by a driver to be transmitted to a steering shaft so that the driver's steering status can be smoothened and stabilized.

However, the conventional power transmission device of an electric power steering apparatus has a problem in that manufacturing errors and assembly errors on the worm shaft and a coupling part of the motor shaft are accumulated such that the driving shaft of the motor and the worm shaft are not positioned coaxially, the locking feeling of the bearings occurs, and the rotating resistance of the worm shaft increases.

Further, when the durability of the worm and the worm wheel is advanced, a clearance occurs due to wearing-out, rattle noise occurs due to backlash, and an unpleasant feeling is caused to the driver at the time of manipulating a steering wheel due to rattle noise generated by impact transmitted from a road surface through a vehicle wheel and the steering shaft.

SUMMARY OF THE INVENTION

The present invention has been made in consideration of the problems described above and an object of the present invention is to provide a power transmission device of an electric power steering apparatus capable of reducing rattle noise generated as backlash increases due to wearing-out of a gear or generated due to impact transmitted from a road surface through a vehicle wheel and a steering shaft while improving a driver's steering feeling by reducing a locking feeling and a rotational resistance between a driving shaft of a motor and a gear shaft.

In order to achieve the object, the present invention provides a power transmission device of an electric power steering apparatus which includes: a driving shaft of a motor having an accommodation part formed at a rotation center thereof; a coupling member inserted into the accommodation part and having an axial through-hole formed therethrough; and a gear shaft including a coupling part formed on one side thereof to be coupled to the axial through-hole, and a gear part formed on the other side thereof.

According to the present invention as described above, in a power transmission device of an electric power steering apparatus, it is possible to reduce rattle noise generated as backlash increases due to wearing-out of a gear or generated due to impact transmitted from a road surface through a vehicle wheel and a steering shaft while improving a driver's steering feeling by reducing a locking feeling and a rotational resistance between a driving shaft of a motor and a gear shaft.

BRIEF DESCRIPTION OF THE DRAWINGS

The above and other objects, features and advantages of the present invention will be more apparent from the following detailed description taken in conjunction with the accompanying drawings, in which:

FIG. 6 is a perspective view illustrating a power transmission device of an electric power steering apparatus according to another embodiment of the present invention in a partially disassembled state;

DETAILED DESCRIPTION OF THE EXEMPLARY EMBODIMENTS

Hereinafter, some embodiments of the present invention will be described in detail with reference to illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
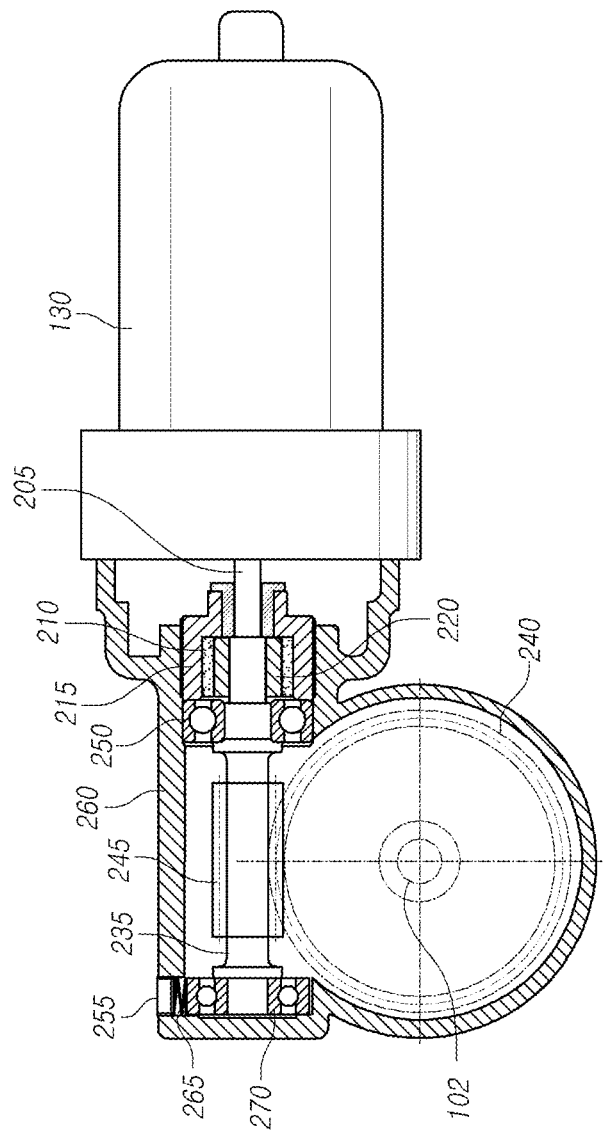
FIG. 1 is a partial sectional view illustrating a conventional power transmission device of an electric power steering apparatus.
Figure 2:
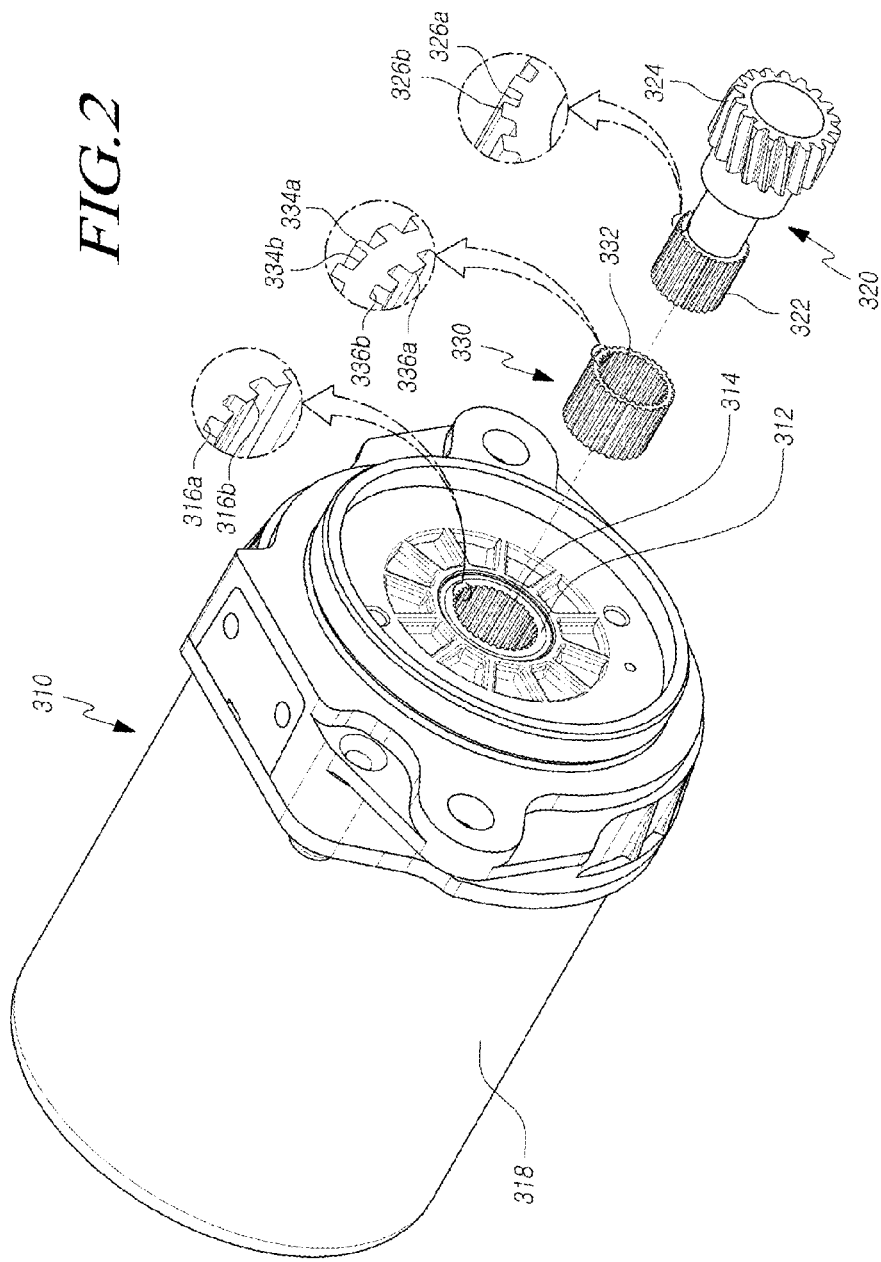
FIG. 2 is a perspective view illustrating a power transmission device of an electric power steering apparatus according to the present invention in a partially disassembled state.
Figure 3:
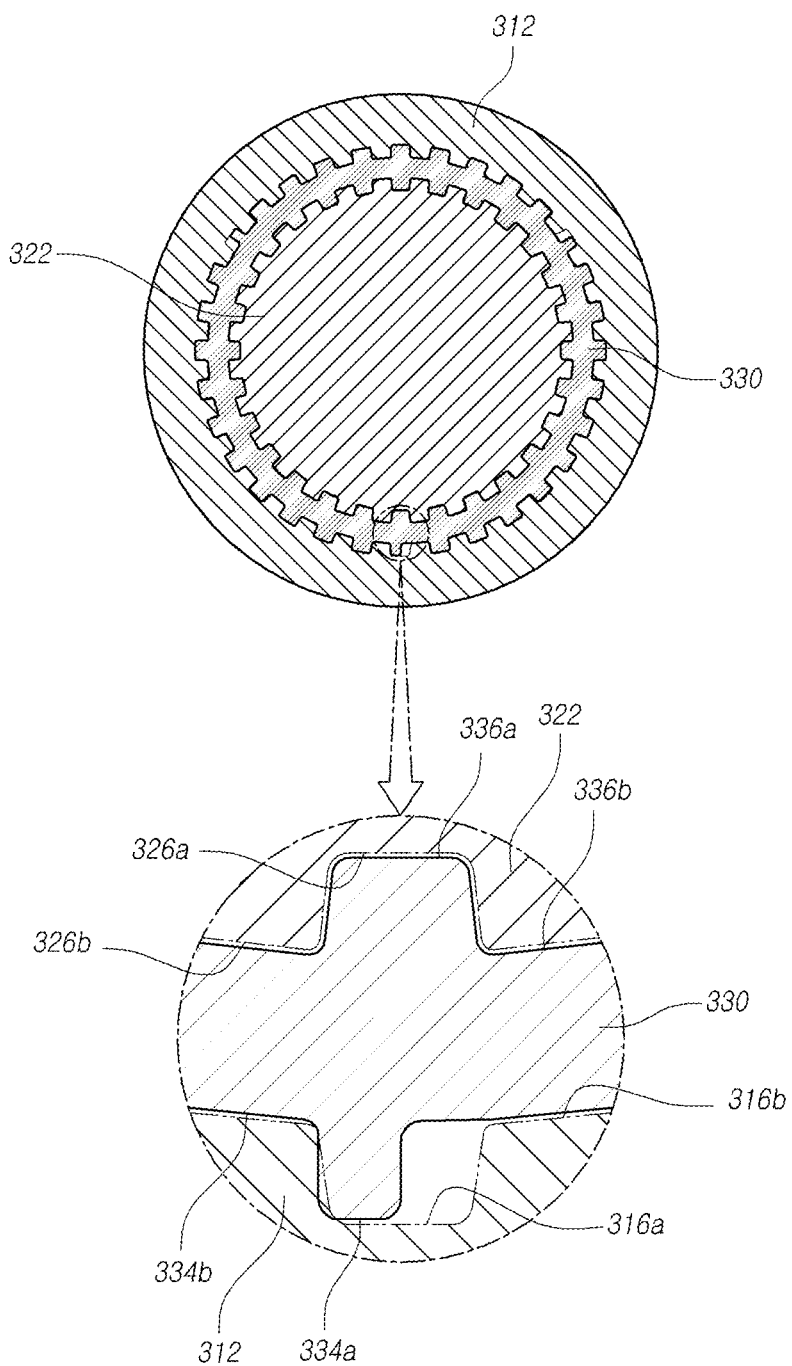
FIG. 3 is a sectional view illustrating a part of the power transmission device of an electric power steering apparatus according to an embodiment the present invention.
Figure 4A:
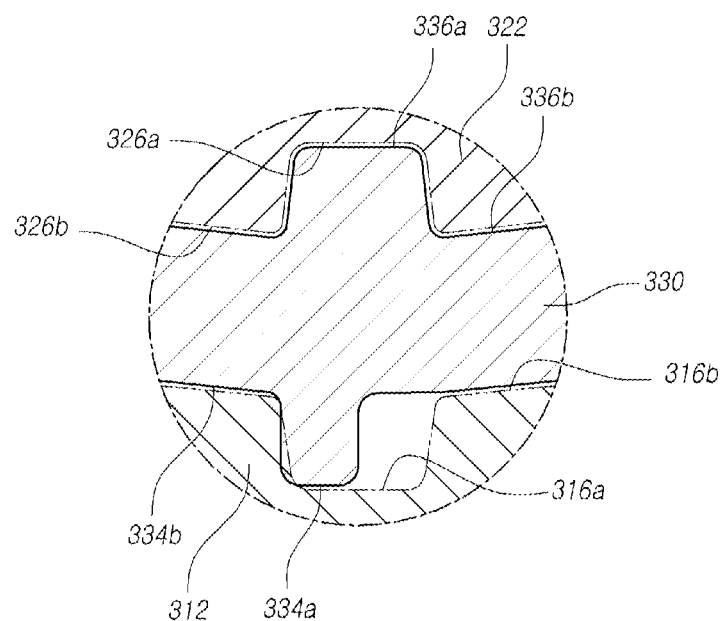
FIGS. 4a and 4b are sectional views illustrating a part of the power transmission device of an electric power steering apparatus according to the present invention in a state where a rib is deformed.
Figure 4B:
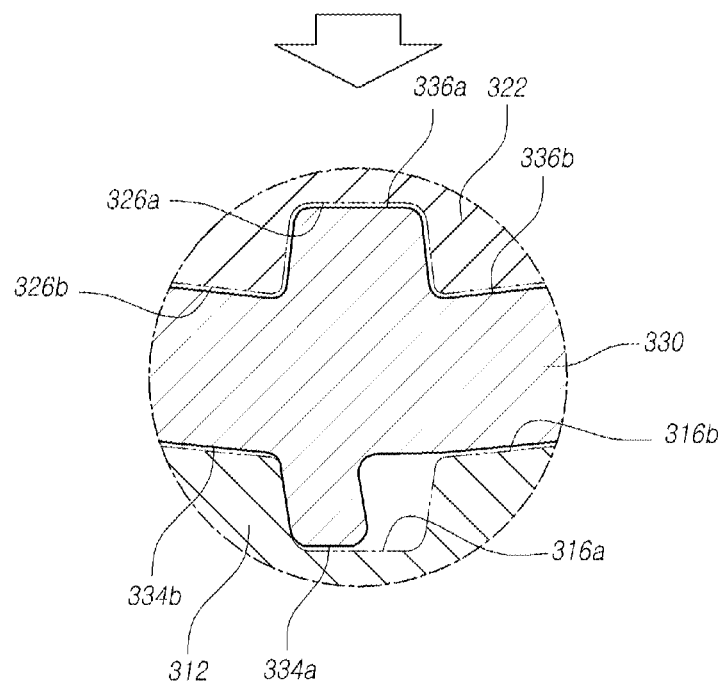
Figure 5A:
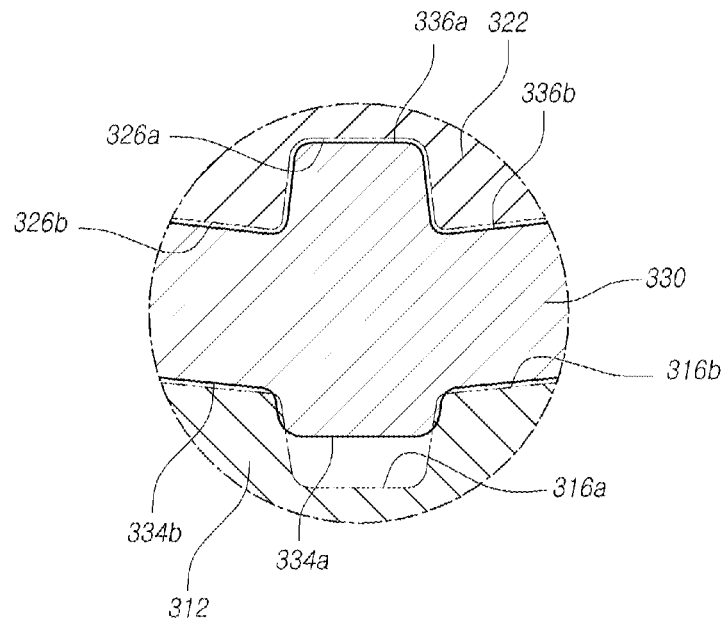
FIGS. 5a and 5b are sectional views illustrating a part of a power transmission device of an electric power steering apparatus according to various embodiments of the present invention.
Figure 5B:
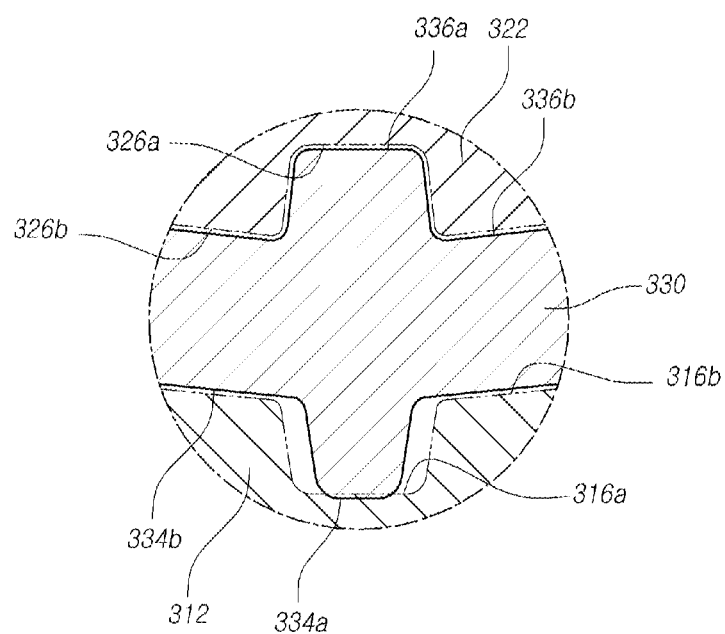

FIG. 2 is a perspective view illustrating a power transmission device of an electric power steering apparatus according to the present invention in a partially disassembled state, and FIG. 3 is a sectional view illustrating a part of the power transmission device of an electric power steering apparatus according to an embodiment the present invention. FIGS. 4a and 4b are sectional views illustrating a part of the power transmission device of an electric power steering apparatus according to the present invention in a state where a rib is deformed, and FIGS. 5a and 5b are sectional views illustrating a part of a power transmission device of an electric power steering apparatus according to various embodiments of the present invention.

A characteristic structure will be described in detail with reference to FIGS. 2 and 3. As illustrated in these drawings, the power transmission device of an electric power steering apparatus according to the present invention includes: a driving shaft 312 of a motor 310, which has an accommodation part 314 formed at a rotation center; a coupling member 330 inserted into the accommodation part 314 and having an axial through-hole 332 formed therethrough; and a gear shaft 320 including a coupling part 322 formed on one side thereof to be coupled to the axial through-hole 332, and a gear part 324 formed on the other side thereof.

The motor 310 has a driving shaft 312 extending to the outside of the motor housing 318, an accommodation part 314 is formed at the rotation center of the driving shaft 312.

The accommodation part 314 may be a groove having an axial depth at the rotation center, or a hollow hole.

On the inner circumferential surface of the accommodation part 314, one or more axial recesses 316a and ribs 316b are formed.

The coupling member 330 includes an axial through-hole 332 formed therethrough, and one or more ribs 334a and recesses 334b formed on the outer circumferential surface thereof to correspond to the recesses 316a and the ribs 316b of the accommodation part 314. The coupling member 330 is inserted into and coupled to the accommodation part 314 such that at least one of the ribs 334a formed on the outer circumferential surface of the coupling member 330 is being elastically compressively deformed and coupled with the ribs 316b formed on the inner circumferential surface of the accommodation part 314.

That is, at least one of the ribs 334a, formed on the outer circumferential surface of the coupling member 330 is elastically compressively deformed and coupled with the ribs 316b formed on the inner circumferential surface of the accommodation part 314. In the present invention, for example, three ribs 334a, which are elastically compressively deformed and coupled, are formed on the coupling member 330 at regular intervals in the circumferential direction as illustrated in FIG. 3. That is, three elastically compressively deformed and coupled ribs 334a are formed on the coupling member 330 at 120° intervals.

Unlike this, two or more of the plurality of ribs 334a, formed on the outer circumferential surface of the coupling member 330, may be formed to be elastically compressively deformed and coupled with the ribs 316b formed on the inner circumferential surface of the accommodation part 314.

In addition, the ribs 334a of the coupling member 330, which are partially elastically compressed deformed and coupled with the ribs 361b formed on the inner circumferential surface of the accommodation part 314, are formed to be smaller than the recesses 316a formed on the inner circumferential surface of the accommodation part 314.

Accordingly, at the time when the coupling member 330 and the accommodation part 314 are coupled to each other, among the ribs 334a formed on the outer circumferential surface of the coupling member 330, the ribs 334a, formed to be elastically compressively deformed and coupled with the ribs 316b formed on the inner circumferential surface of the accommodation part 314, are formed to be smaller than the recesses 316a of the accommodation part 314 so that the ribs 334a are deformed and coupled in empty spaces.

That is, the width of each rib 334a is formed to be narrower than the width of each recess 316a to form a space and to overlap with an adjacent rib 316b such that the rib 334a is elastically compressively deformed and coupled.

In other words, as illustrated in FIG. 4a, among the ribs 334a of the coupling member 330, when a rib 334a, formed to be elastically compressively deformed and coupled with a rib 316b of the accommodation part 314, is deformed and coupled as illustrated FIG. 4b, an elastic restoration is continuously generated to remove a clearance between the driving shaft 312 and the coupling member 330.

Accordingly, with the help of the elastic restoration of the ribs 334a, even if the driving shaft 312 of the motor 310 coupled to the coupling member 330 and the coupling part 322 of the gear shaft 320, which will be described later, are not coaxially positioned or the gear shaft 320 is moved due to impact applied from a road surface, the rotation center of the gear shaft 320 at the time of driving the motor 310 moves to the driving shaft 312 of the motor 310 so that the driving force of the motor 310 can be stably transmitted to the gear shaft 320.

Here, the coupling member 330 is formed of a synthetic resin, such as rubber or plastic, so as to provide a damping action such that the generation of rattle noise may be prevented even if impact is applied from a road surface while the vehicle travels.

As described above, since at least one of the ribs 334a formed on the outer circumferential surface of the coupling member 330 is elastically compressively deformed and coupled with a rib 316b formed on the inner circumferential surface of the accommodation part 314, the coupling member 330 may be prevented from being moved or slipped in the axial direction by the frictional force between the ribs 316b and 334a.

In addition, as illustrated in FIG. 5, in order to prevent the coupling member 330 from being moved or slipped in the axial direction, among the ribs 334a formed on the outer circumferential surface of the coupling member 330, at least one rib 334a is formed to be larger than a recess 316a. Specifically, as illustrated in FIG. 5a, the width of the recess 334a may be formed to be wider than the width of the rib 316a, or as illustrated in FIG. 5b, the protruding height of the rib 334a may be formed to be higher than the depth of the recess 316a.

That is, in FIG. 5a, the protruding height of the rib 334a is lower than the depth of the recess 316a so as to form a space, and the width of the rib 334a is formed to be wider than the width of the recess 316a so that the overlapping recess 316a and rib 334a are elastically compressively deformed and coupled with each other.

In addition, in FIG. 5b, the width of the rib 334a is narrower than the width of the recess 316a to form a space, and the protruding height of the rib 334a is formed to be higher than the depth of the recess 316a, so that the overlapping recess 316a and rib 334a are elastically compressively deformed and coupled with each other.

Figure 7:
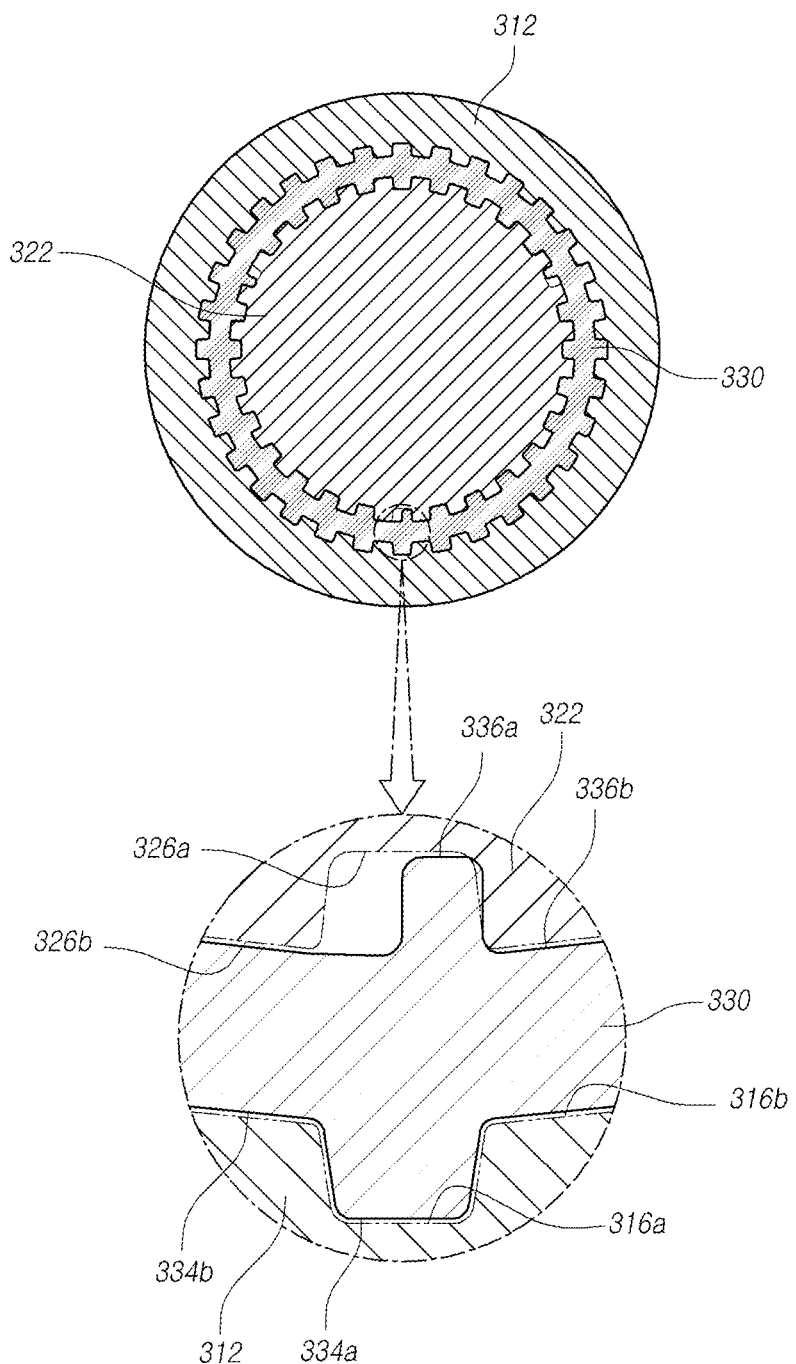
FIG. 7 is a sectional view illustrating a part of the power transmission device of an electric power steering apparatus according to still another embodiment the present invention.

FIG. 6 is a perspective view illustrating a power transmission device of an electric power steering apparatus according to another embodiment of the present invention in a partially disassembled state, and FIG. 7 is a sectional view of a part of the power transmission device of an electric power steering apparatus according to another embodiment of the present invention.

Subsequently, a characteristic structure will be described in detail with reference to FIGS. 6 and 7. As illustrated in these drawings, on the inner circumferential surface of the coupling member 330, one or more recesses 336b and one or more ribs 336a are formed, and a coupling part 322 of a gear shaft 320 to be described later is inserted into and coupled to the coupling member 330.

The gear shaft 320 includes a coupling part 322 formed at one side thereof and coupled to an axial through-hole 332 of the coupling member 330, and a gear part 234 formed at the other side.

In addition, the coupling part 322, inserted into and coupled to the inner circumferential surface of the coupling member 330, includes one or more ribs 326b and recesses 326a formed on the outer circumferential surface thereof to correspond to the recesses 336b and ribs 336a formed on the inner circumferential surface of the coupling member 330, in which at least one of the ribs 336a formed on the inner circumferential surface of the coupling member 330 is formed to be elastically compressively deformed and coupled with the ribs 326b formed on the outer circumferential surface of the coupling part 322.

That is, at least one of the ribs 336a, formed on the inner circumferential surface of the coupling member 330, is elastically compressively deformed and coupled with the ribs 336b formed on the outer circumferential surface of the accommodation part 322. In the present invention, for example, three ribs 336a, which are elastically compressively deformed and coupled, are formed on the coupling member 330 at regular intervals in the circumferential direction as illustrated in FIG. 7. That is, three elastically compressively deformed and coupled ribs 336a are formed on the coupling member 330 at 120° intervals.

Unlike this, two or more of the plurality of ribs 336a, formed on the inner circumferential surface of the coupling member 330, may be formed to be elastically compressively deformed and coupled with the ribs 326b formed on the coupling part 322.

In addition, the ribs 336a of the coupling member 330, which are partially elastically compressively deformed and coupled with the ribs 326b formed on the outer circumferential surface of the coupling part 322, are formed to be smaller than the recesses 326a formed on the outer circumferential surface of the coupling part 322.

Accordingly, at the time when the coupling member 330 and the coupling part 322 are coupled to each other, among the ribs 336a formed on the inner circumferential surface of the coupling member 330, the ribs 336a, formed to be elastically compressively deformed and coupled with the ribs 326b formed on the outer circumferential surface of the coupling part 322, are formed to be smaller than the recesses 326a of the coupling part 322 so that the ribs 336a are deformed and coupled in empty spaces.

That is, the width of each rib 336b is formed to be narrower than the width of each recess 326a to form a space and to overlap with an adjacent rib 326b such that the rib 336a is elastically compressively deformed and coupled.

In other words, among the ribs 336a of the coupling member 330, when a rib 336a, formed to be elastically compressively deformed and coupled with a rib 326b of the coupling part 322, is deformed and coupled, an elastic restoration is continuously generated to remove a clearance between the gear shaft 320 and the coupling member 330.

Accordingly, with the help of the elastic restoration of the ribs 336a, even if the driving shaft 312 of the motor 310 coupled to the coupling member 330 and the coupling part 322 of the gear shaft 320 which will be described later are not coaxially positioned or the gear shaft 320 is moved due to impact applied from a road surface, the rotation center of the gear shaft 320 at the time of driving the motor 310 moves to the driving shaft 312 of the motor 310 so that the driving force of the motor 310 can be stably transmitted to the gear shaft 320.

As described above, since at least one of the ribs 336a, formed on the inner circumferential surface of the coupling member 330, is elastically compressively deformed and coupled with a rib 326b formed on the outer circumferential surface of the coupling part 322, the coupling member 330 may be prevented from being moved or slipped in the axial direction by the frictional force between the ribs 336a and 326b.

Figure 8:
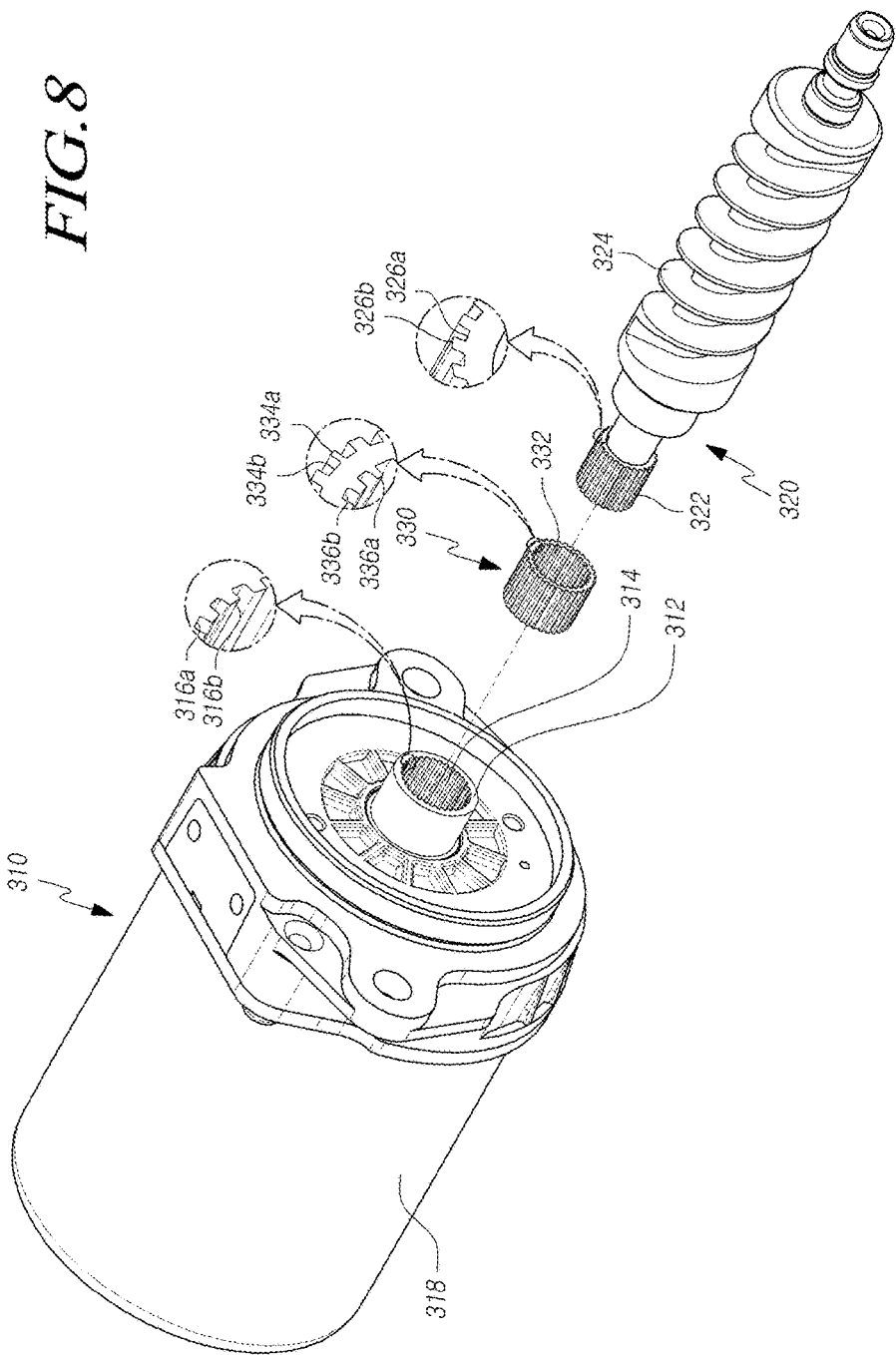
FIG. 8 is a perspective view illustrating a power transmission device of an electric power steering apparatus according to yet another embodiment the present in a partially disassembled state.

FIG. 8 is a perspective view illustrating a power transmission device of an electric power steering apparatus according to still another embodiment of the present invention in a partially disassembled state.

In the foregoing embodiments, it has been described that the accommodation part 314 of the motor shaft 312 is formed as a hole, and the gear part 324 of the gear shaft 320 is formed as a sun gear of a planetary gear, and that the coupling member 330 is coupled to the accommodation part 314, and the coupling part 322 of the gear shaft 320 is coupled to the axial through-hole 332 of the coupling member 330, but the present invention is not limited thereto.

That is, as illustrated in FIG. 8, the accommodation part 314 may be formed as a recess in the motor shaft 312, and the gear part 324 of the gear shaft 320 may be formed as a worm gear such that the coupling member 330 may be coupled to the accommodation part 314, and the coupling part 322 of the gear shaft 320 may be coupled to the axial through-hole 332 of the coupling member 330.

As described above, according to the present invention, it is possible to reduce rattle noise generated as backlash increases due to wearing-out of a gear or generated due to impact transmitted from a road surface through a vehicle wheel and a steering shaft while improving a driver's steering feeling by reducing a locking feeling and a rotational resistance between a driving shaft of a motor and a gear shaft.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A power transmission device of an electric power steering apparatus, the power transmission device comprising:
   a driving shaft of a motor having an accommodation part formed at a rotation center thereof;
   a coupling member inserted into the accommodation part and having an axial through-hole formed therethrough; and
   a gear shaft including a coupling part formed on one side thereof to be coupled to the axial through-hole, and a gear part formed on the other side thereof,
   wherein the accommodation part includes one or more axial recesses and axial ribs, which are formed on an inner circumferential surface thereof, and the coupling member includes one or more recesses and ribs that are formed on an outer circumferential surface thereof to correspond to the recesses and the ribs of the accommodation part,
   wherein at least one of the ribs formed on the outer circumferential surface of the coupling member is elastically compressively deformed and coupled with at least one of the ribs formed on the inner circumferential surface of the accommodation part, and
   wherein, among the ribs of the coupling member, a rib, which is elastically compressively deformed and coupled with the ribs of the accommodation part, is formed to have a width narrower than a width of the accommodation part recesses such that a space is formed.

2. The power transmission device of claim 1, wherein the rib of the coupling member is formed to overlap with a rib in the accommodation part adjacent thereto such that the rib is elastically compressively deformed and coupled.

3. The power transmission device of claim 1, wherein at least one of the ribs formed on the outer circumferential surface of the coupling member is formed to have a width wider than the width of the recesses formed on the inner circumferential surface of the accommodation part such that the rib is elastically compressively deformed and coupled.

4. The power transmission device of claim 1, wherein at least one of the ribs formed on the outer circumferential surface of the coupling member is formed to have a height higher than a depth of the recesses formed on the inner circumferential surface of the accommodation part such that the rib is elastically compressively deformed and coupled.

5. The power transmission device of claim 1, wherein the coupling part includes an axial recess and an axial rib formed on an outer circumferential surface, and the coupling member includes one or more ribs and one or more recesses formed on an inner circumferential surface thereof to correspond to the recess and the rib of the coupling part.

6. The power transmission device of claim 5, wherein at least one of the ribs formed on the inner circumferential surface of the coupling member is elastically compressively deformed and coupled with the rib formed on the outer circumferential surface of the coupling part.

7. The power transmission device of claim 6, wherein, among the ribs of the coupling member, a rib, which is elastically compressively deformed and coupled with the rib of the coupling part, is formed to have a width narrower than the recess of the coupling part such that a space is formed, and is formed to overlap with the rib of the coupling part adjacent thereto such that the rib is elastically compressively deformed and coupled.

* * * * *